United States Patent [19]

Yatomi et al.

[11] Patent Number: 5,500,683
[45] Date of Patent: Mar. 19, 1996

[54] IMAGE DISPLAY APPARATUS

[75] Inventors: Toshiya Yatomi, Kawasaki; Masahiko Enari, Yokohama, both of Japan

[73] Assignee: Canon Kabushiki Kaisha, Tokyo, Japan

[21] Appl. No.: 498,000

[22] Filed: Jun. 7, 1995

Related U.S. Application Data

[63] Continuation of Ser. No. 221,971, Apr. 4, 1994, abandoned, which is a continuation of Ser. No. 672,125, Mar. 19, 1991, abandoned.

[30] Foreign Application Priority Data

Mar. 26, 1990 [JP] Japan ................................ 2-77492
Apr. 26, 1990 [JP] Japan ............................... 2-108907

[51] Int. Cl.$^6$ ........................................... H04N 7/010
[52] U.S. Cl. ..................... 348/565; 348/564; 348/563; 348/445
[58] Field of Search ............................ 348/565, 564, 348/563, 445

[56] References Cited

U.S. PATENT DOCUMENTS

| | | | |
|---|---|---|---|
| 4,249,211 | 2/1981 | Beba et al. | 358/183 |
| 4,598,309 | 7/1986 | Casey | 358/11 |
| 4,670,784 | 6/1987 | Goldberg | 358/141 |
| 4,984,081 | 1/1991 | Miyoshi et al. | 358/180 |

FOREIGN PATENT DOCUMENTS

| | | | |
|---|---|---|---|
| 0072284 | 4/1984 | Japan | 358/140 |
| 0257681 | 12/1985 | Japan | 358/183 |
| 0146672 | 6/1988 | Japan | 358/183 |
| 0263882 | 10/1988 | Japan | H04N 5/445 |
| 0303996 | 12/1989 | Japan | 358/183 |
| 0051984 | 2/1990 | Japan | H04N 7/010 |
| 0143780 | 6/1990 | Japan | H04N 5/445 |
| 0149191 | 6/1990 | Japan | H04N 5/460 |
| 0312369 | 12/1990 | Japan | H04N 5/460 |
| 4008080 | 1/1992 | Japan | H04N 5/445 |

Primary Examiner—Curtis Kuntz
Assistant Examiner—Minsun Oh
Attorney, Agent, or Firm—Fitzpatrick, Cella, Harper & Scinto

[57] ABSTRACT

An image display apparatus for displaying an image corresponding to an image signal selectively inputs a first image signal and a second image signal having an aspect ratio different from that of the first image signal. When the second image signal is input, the second image signal is converted into an image signal corresponding to the aspect ratio of the first image signal, and the converted image signal is supplied to an image display unit for displaying an image corresponding to the aspect ratio of the first image signal. Thus, it is possible to display an image in a manner easy to observe, and to effectively utilize the display picture surface.

6 Claims, 5 Drawing Sheets

IMAGE DISPLAY APPARATUS

This application is a continuation of application Ser. No. 08/221,971, filed Apr. 4, 1994, which is a continuation of application Ser. No. 07/672,125, filed Mar. 19, 1991, now both abandoned.

BACKGROUND OF THE INVENTION

1. Field of the Invention

This invention relates to an image display apparatus for displaying an image.

2. Description of the Prior Art

Heretofore, when displaying, for example, an image having an NTSC television signal using a television monitor apparatus conforming to a high-definition television system, the signal is supplied to the television monitor apparatus while increasing the number of scanning lines for the NTSC (National Television Systems Committee) television signal so as to conform to the high-definition television system. High definition television is generally recognized as a system which uses an increased number of horizontal lines of resolution per frame to enhance picture quality. Thus, as shown in FIG. 1, an image (reference numeral 21) of the NTSC television signal is displayed on a predetermined position on the picture surface (reference numeral 22) of the television monitor apparatus.

Figure 1:
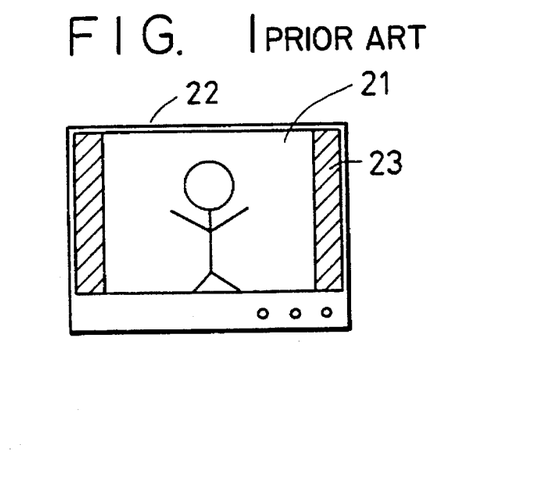
FIG. 1 illustrates a display picture surface of a conventional image display apparatus.

In the above-described conventional method, however, a blank portion on which an image is not displayed is present on the picture surface of the television monitor apparatus, as shown in FIG. 1, due to a difference in aspect ratio between the NTSC system and the high-definition television system. Such a blank portion is very uncomfortable to observe. In addition, the display picture surface of the television monitor apparratus cannot be effectively utilized.

SUMMARY OF THE INVENTION

It is an object of the present invention to provide an image display apparatus which can solve the above-described problems.

It is another object of the present invention to provide an image display apparatus which can display an image in a manner easy to observe.

These objects are accomplished, according to one aspect of the present invention, by an image display apparatus for displaying an image corresponding to an image signal, comprising an image display unit for displaying an image corresponding to an aspect ratio of a first image signal, and an image signal supply means for selectively inputting the first image signal and a second image signal having an aspect ratio different from that of the first image signal, for converting the second image signal into the image signal corresponding to the aspect ratio of the first image signal when the second image signal has been input, and for supplying the image display unit with the converted signal.

It is still another object of the present invention to provide an image display apparatus which can effectively utilize its display picture surface.

This object is accomplished, according to another aspect of the present invention, by an image display apparatus for displaying an image corresponding to an image signal, comprising an image display unit for displaying an image corresponding to an aspect ratio of a first image signal, image signal conversion means for inputting a second image signal having an aspect ratio different from that of the first image signal, and for converting the input second image signal into an image signal corresponding to the aspect ratio of the first image signal, and display control means for controlling the display unit so as to display the image signal formed by the image signal conversion means on a first display picture surface of the image display unit, and to display an image corresponding to another information on a second display picture surface which is present on the same picture surface as the first display picture surface and is different from the first display picture surface.

The foregoing and other objects and features of the present invention will become more apparent from the following detailed description of the preferred embodiments taken in connection with the accompanying drawings.

DETAILED DESCRIPTION OF THE PREFERRED EMBODIMENTS

The present invention will now be explained with reference to preferred embodiments of the invention.

Figure 2:
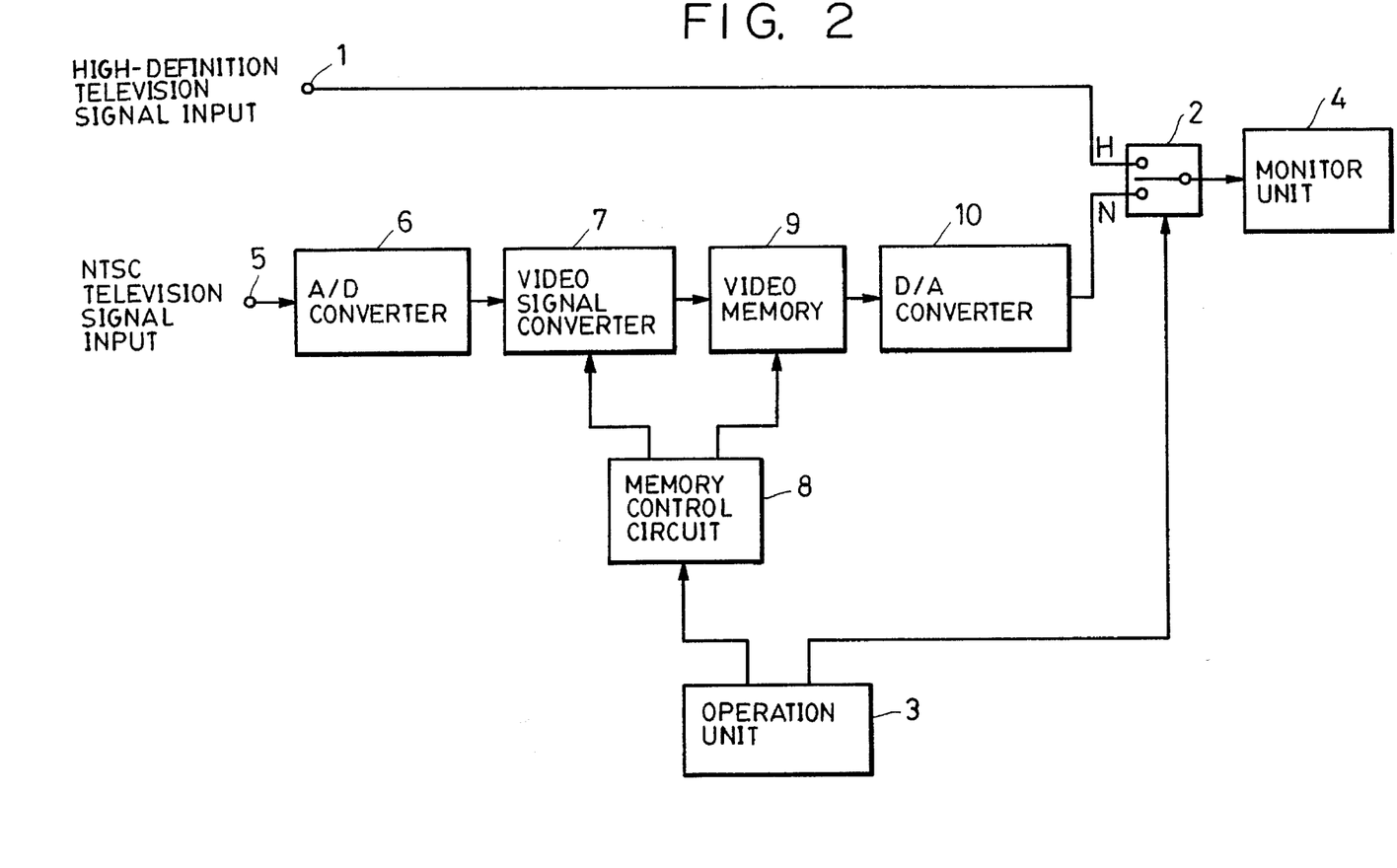
FIG. 2 is a block diagram showing the schematic configuration of an image display apparatus according to a first embodiment of the present invention.

FIG. 2 is a block diagram showing the schematic configuration of an image display apparatus according to a first embodiment of the present invention.

In FIG. 2, a high-definition television signal and an NTSC television signal are input to input terminals 1 and 5, respectively.

By operating an operation unit 3, the operator connects a switch 2 to side H (high definition signal) when displaying an image of the high-definition television signal on a monitor unit 4, and connects the switch 2 to side N (NTSC signal) when displaying an image of the NTSC television signal.

When displaying the image of the high-definition television signal, the high-definition television signal is directly supplied to the monitor unit 4 via the switch 2, and the high-definition television image is displayed on the monitor unit 4.

The display operation of an NTSC television image in the present embodiment will now be explained.

Figure 4:
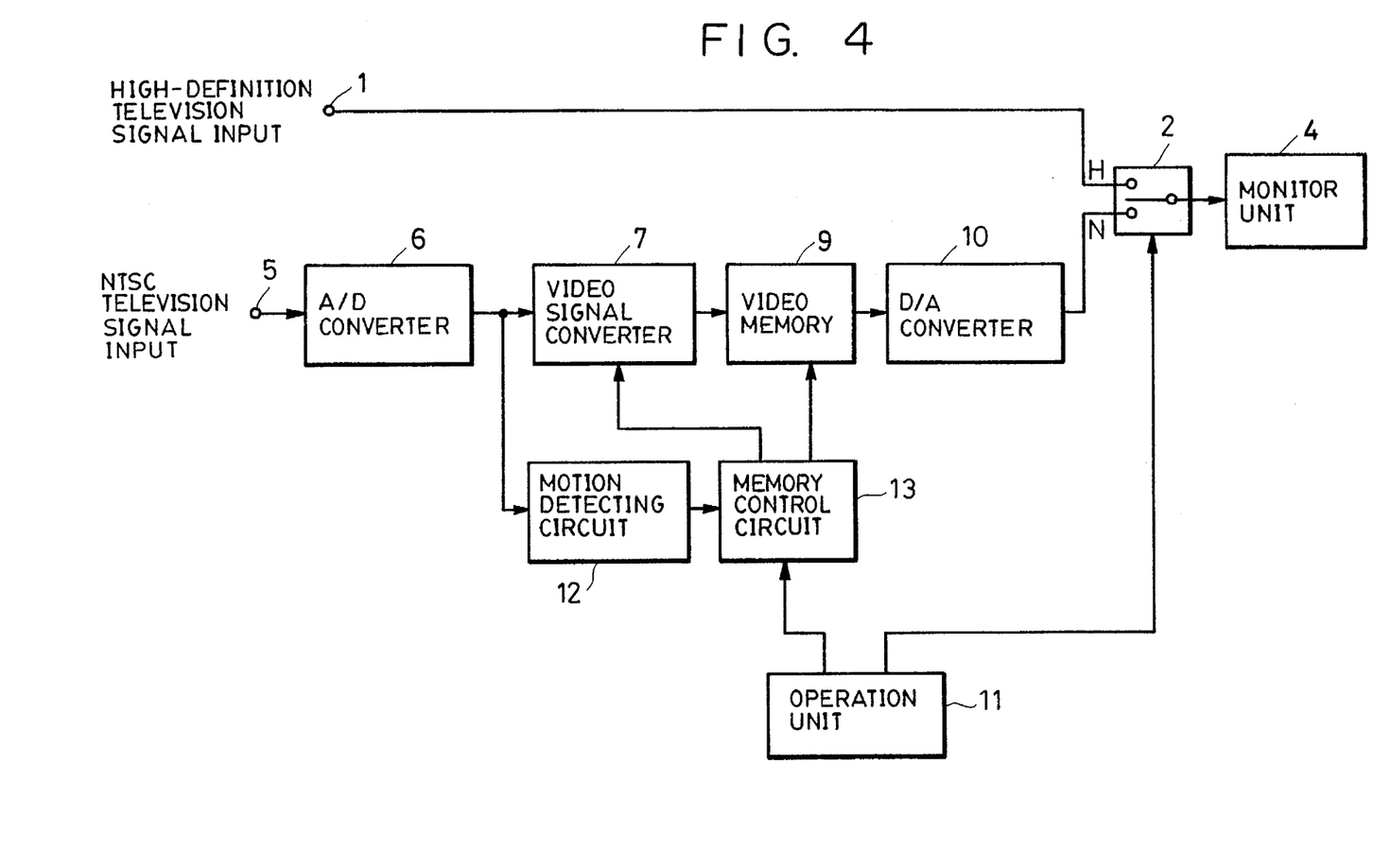
FIG. 4 is a block diagram showing the schematic configuration of an image display apparatus according to a second embodiment of the present invention.
Figure 5:
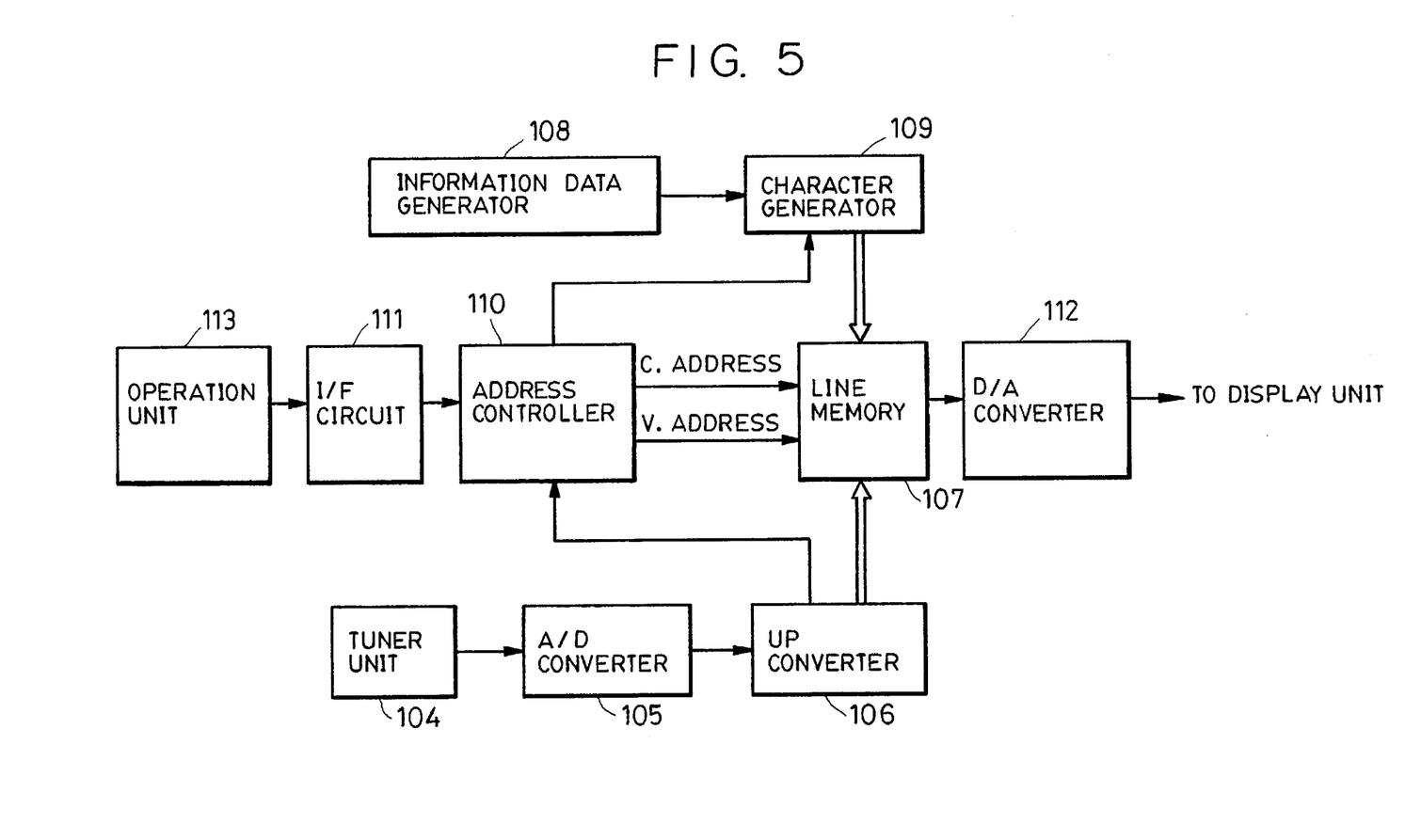
FIG. 5 is a block diagram showing the schematic configuration of an image display apparatus according to a third embodiment of the present invention.
Figure 7:
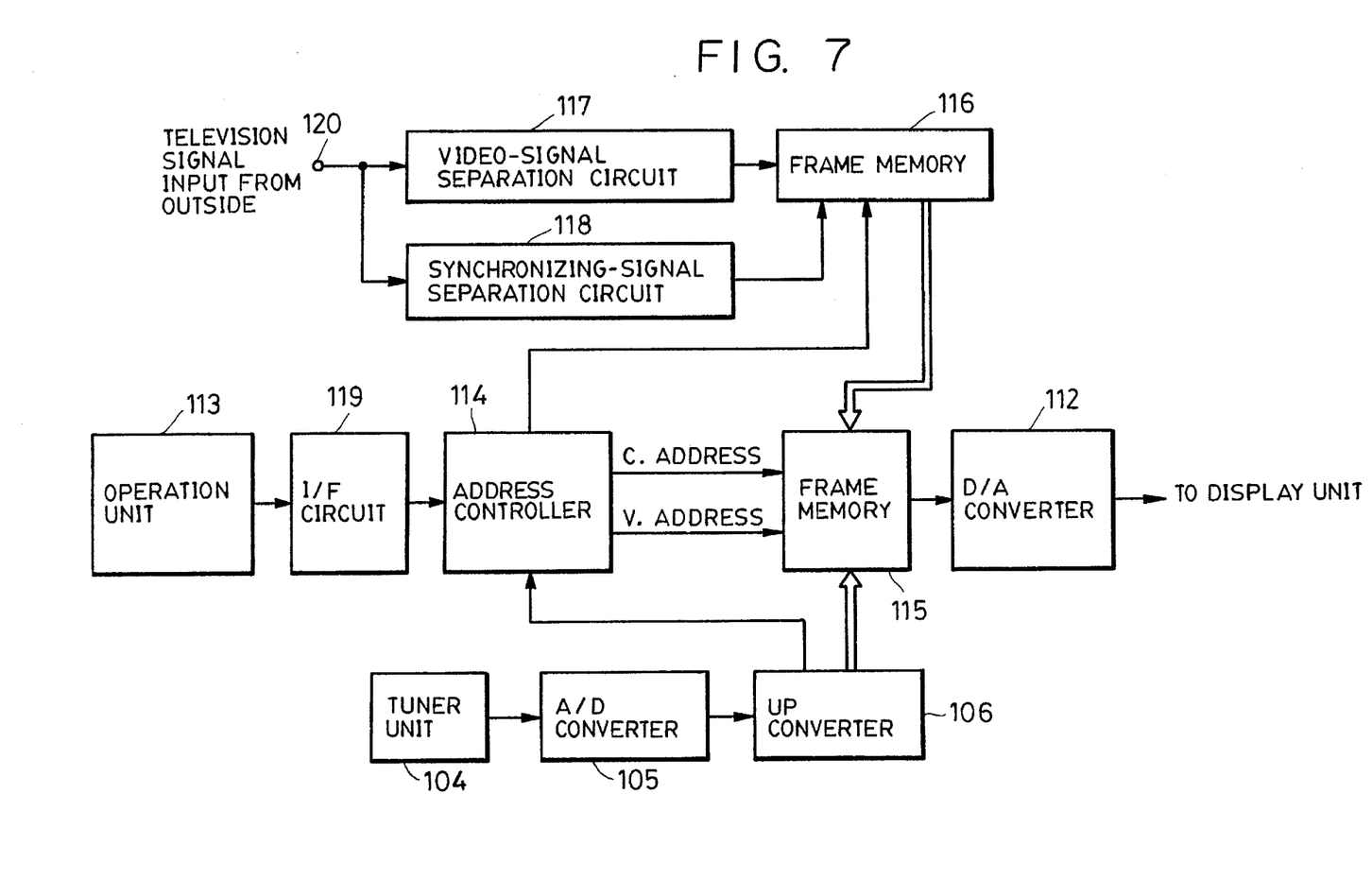
FIG. 7 is a block diagram showing the schematic configuration of an image display apparatus according to a fourh embodiment of the present invention.

Each of the elements shown in block outline in FIG. 2, as well as in FIGS. 4, 5 and 7, is well known per se and its specific type pr construction is not critical to carrying out the invention or for disclosure of the best mode for carrying out the invention.

In FIG. 2, by operating the operation unit 3, the operator connects the switch 2 to side N when displaying the NTSC television image on the monitor unit 4.

The NTSC television signal input to the input terminal 5 is converted into a digital signal by an A/D converter 6, and the converted signal is supplied to a video signal converter 7.

In order to conform the horizontal scanning period of the digitized NTSC television signal output from the A/D converter 6 to a high-definition television signal, the video signal converter 7 performs expansion processing by interpolation, and supplies a video memory 9 with the resultant signal.

A synchronizing signal corresponding to the high-definition television signal is supplied from a memory control circuit 8 to the video signal converter 7, which performs the above-described expansion processing in accordance with the synchronizing signal output from the memory control circuit 8.

The television signal subjected to the above-described expansion processing for the horizontal scanning period by the video signal converter 7 is first stored in the video memory 9, which performs interpolation processing in order to expand the television signal in the vertical direction in accordance with the expansion processing for the horizontal scanning period of the television signal performed by the video signal converter 7.

If the television signal subjected to the above-described expansion processing in the vertical direction by the video memory 9 is displayed on the monitor unit 4 as it is, part of the picture frame in the vertical direction corresponding to the television signal cannot be displayed due to the aspect ratio of the high-definition television signal.

In order to solve such a problem, by operating the operation unit 3, the operator indicates the display position of the picture frame corresponding to the television signal on the monitor unit 4 to the memory control circuit 8, which assigns a read address corresponding to the display position indicated by the operation unit 3 to the video memory 9. Image data stored in the assigned address in the video memory 9 are read, and are supplied to a D/A converter 10.

The D/A converter 10 converts the image data supplied from the video memory 9 into analog data, and supplies the converted data to the monitor unit 4 via the switch 2 connected to side N. Thus, an image subjected to expansion processing is displayed on the display picture surface of the monitor unit 4, as shown in FIG. 3.

Figure 3:
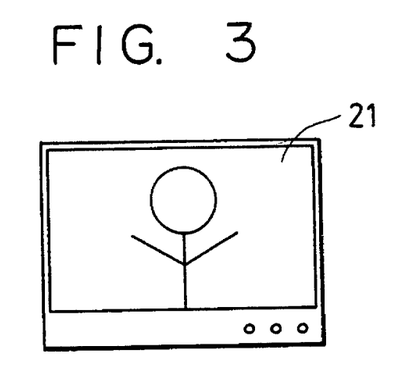
FIG. 3 illustrates a display picture surface of the image display apparatus shown in FIG. 2.

As shown in FIG. 3, by performing the above-described processing, a blank portion which has previously been present when displaying an image corresponding to an NTSC television signal on a monitor apparatus conforming to a high-definition television signal is not present, and it becomes therefore possible to effectively utilize the display picture surface of the television monitor apparatus.

A second embodiment of the present invention will now be explained with reference to FIG. 4.

In FIG. 4, like components as those in the FIG. 2 embodiment are indicated by like numerals, and a detailed explanation thereof will be omitted.

In FIG. 4, by operating an operation unit 11, the operator connects the switch 2 to side N when displaying an NTSC television image on the monitor unit 4.

An NTSC television signal input to the input terminal 5 is converted into a digital signal by the A/D converter 6, and the converted signal is supplied to the video signal converter 7 and a motion detecting circuit 12.

In order to conform the horizontal scanning period of the digitized NTSC television signal output from the A/D converter 6 to a high-definition television signal, the video signal converter 7 performs expansion processing by interpolation, and supplies the video memory 9 with the resultant signal.

A synchronizing signal corresponding to the high-definition television signal is supplied from a memory control circuit 13 to the video signal converter 7, which performs the above-described expansion processing in accordance with the synchronizing signal output from the memory control circuit 13.

The television signal subjected to the above-described expansion processing for the horizontal scanning period by the video signal converter 7 is first stored in the video memory 9, which performs interpolation processing in order to expand the television signal in the vertical direction in accordance with the expansion processing for the horizontal scanning period of the television signal performed by the video signal converter 7.

In the FIG. 2 embodiment, by assigning the display position of the picture frame corresponding to the television signal on the monitor unit to the memory control circuit using the operation unit, assigned image data are read from among image data stored in the video memory, and are displayed on the monitor unit. In the FIG. 4 embodiment, however, the read address of image data stored in the video memory 9 is controlled so that an image portion having the largest motion on the picture frame is displayed near the center of the picture surface of the monitor unit 4.

That is, the digitized television signal output from the A/D converter 6 is supplied to the motion detecting circuit 12, which compares the picture frame represented by the supplied digital television signal with the precedent picture frame, detects a portion having the largest motion on the supplied picture frame, and outputs a detection signal to the memory control circuit 13.

The memory control circuit 13 assigns a read address so that image data assigned by the detection signal supplied from the motion detecting circuit 12 are situated near the center of the display picture surface of the monitor unit 4, reads image data stored in the assigned address in the video memory 9, and supplies the D/A converter 10 with the data.

The D/A converter 10 converts the image data supplied from the video memory 9 into analog data, and supplies the monitor unit 4 with the converted data via the switch 2 connected to side N. Thus, an image is displayed on the display picture surface of the monitor unit 4 wherein an image portion having the largest motion is situated near the center of the picture surface.

As described above, in the FIG. 4 embodiment, it becomes possible to display an image so that an image portion having the largest motion is situated near the center of the display picture surface of the monitor apparatus in accordance with the motion of the image.

As explained above, according to the first and second embodiments, it becomes possible to display an image in a manner easy to observe, and to effectively utilize the display picture surface.

Figure 6:
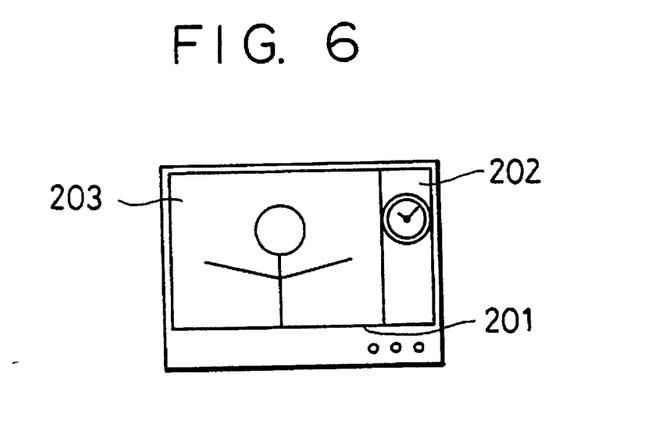
FIG. 6 illustrates a display picture surface of the image display apparatus shown in FIG. 5.

FIG. 5 is a block diagram showing the schematic configuration of an image display apparatus according to a third embodiment of the present invention. FIG. 6 shows a display example on the display unit of the image display apparatus shown in FIG. 5.

In FIG. 5, a tuner unit 104 generates NTSC television signals. An A/D converter 108 converts an analog signal into a digital signal. An up converter 106 converts the television signal digitized by the A/D converter 105 from an NTSC television signal into a television signal of a high-definition system. A line memory 107 stores digital television signals from the up converter 106, and the like. An information data generator 108 generates information data, such as time, the date and the like. A character generator 109 generates display data corresponding to the information data supplied from the information data generator 108 and display data corresponding to information other than the above-described time and date. An address controller 110 controls the write positions of digital television signals supplied from the up converter 106 to the line memory 107, and the write positions of display data supplied from the character generator 109. An I/F (interface) circuit 111 converts assigned data from an operation unit 113 having switches, variable resistors, joy sticks and the like into control data for controlling the address controller 110. A D/A converter 112 converts a digital signal output from the line memory 107 into an analog signal, and outputs the converted signal to a display unit (not shown).

In the configuration shown in FIG. 5, an NTSC television signal generated from the tuner unit 104 is supplied to the A/D converter 105, and is converted from an analog television signal into a digital television signal by the A/D converter 105. The digital television signal is converted into a high-definition television signal by the up converter 106. The up converter 106 supplies the address controller 110 with a horizontal synchronizing signal synchronized with the digital television signal for one line output from the up converter 106.

The information data, such as time, the date and the like, (the information data, such as the month, day, hour, minute, second and the like) generated from the information data generator 108 are input to the character generator 109. After the digital television signal for one line has been supplied from the up converter 106 to the line memory 107 in accordance with the horizonal synchronized signal supplied from the up converter 106, the character generator 109 generates a character signal representing time and the date corresponding to the digital television signal.

By operating the operation unit 113 having the switches, variable resistors, joy sticks and the like, assigning data for assigning the display position of an image, the display position of information, and the like on the display unit are converted into control data for controlling the address controller 110 by the I/F circuit 111, and the converted data are input to the address controller 110. The address controller 110 controls the write address of the digital television signal supplied from the up converter 106 in the line memory 107 in accordance with the control data from the I/F circuit 111. That is, in order to store the digital television signal in the line memory 107 making the address corresponding to the display position of the image assigned by the assigning data supplied from the operation unit 113 a leading write address, and to store the character signal generated from the character generator 109 in addresses from the address next to the final write address for the digital television signal output from the up converter 106 and stored in the line memory 107 until the final write address of the line memory 107, the address controller 110 generates control data for controlling the write address of the line memory 107 when writing the digital television signal and the character signal in the line memory 107. The line memory 107 sequentially writes respective signals in accordance with the control data generated from the address controller 110.

After the storage operation of the line memory 107 has been completed as described above, the stored signals are sequentially read from the leading address of the line memory 107, converted from digital signals into analog signals by the D/A converter 112, and output to and displayed on the display unit. Thus, on a display unit 201 of a high definition image display apparatus as shown in FIG. 6, it becomes possible to perform a display corresponding to other information (for example, a clock or the like) on a blank portion 202 in addition to the display (reference numeral 203) of the television image.

Although, in the present embodiment, a display corresponding to time is performed as information other than the television image, an image corresponding to a television signal generated from a TV camera in a system, such as a door interphone, a TV telephone or the like, may also be displayed as other information.

FIG. 7 is a block diagram showing the configuration of an image display apparatus according to a fourth embodiment of the present invention. In FIG. 7, like components as those shown in the FIGS. 5 and 6 embodiments are indicated by like numerals, and a detailed explanation thereof will be omitted.

In FIG. 7, a frame memory 115 stores digital television signals supplied from the up converter 106. An address controller 114 controls the write positions of digital television signals supplied from the up converter 106, the reading operation of image data stored in a frame memory 116 (to be desribed later), and the writing operation of the read image data in the frame memory 115.

A video-signal separation circuit 117 separates a video-signal portion from a television signal generated from a TV camera in a system, such as a TV telephone, a door interphone or the like, input via input terminal 120. A synchronizing-signal separation circuit 118 separates a synchronizing-signal portion from the television signal input via the input terminal 120. The frame memory 116 digitizes the video signal separated from the television signal by the video-signal separation circuit 117 in synchronization with the synchronizing signal separated by the synchronizing-signal separation circuit 118, and stores the digitized signal.

In the configuration shown in FIG. 7, the NTSC television signal generated by the tuner unit 104 is supplied to the A/D converter 105, and is converted from an analog television signal into a digital television signal by the A/D converter 105. The digital television signal is converted into a high-definition television signal by the up converter 106. The up converter 106 supplies the address controller 114 with a horizontal synchronizing signal synchronized with the digital television signal for one line output from the up converter 106.

The television signal generated from the TV camera in a system, such as a TV telephone, a door interphone or the like, is input to input terminal 120. The video-signal separation circuit 117 separates a video-signal portion from the television signal, and the synchronizing-signal separation circuit 118 separates a synchronizing-signal portion from the television signal. The video signal separated by the video-signal separation circuit 117 is digitized in synchronization with the synchronizing signal separated by the synchronizing-signal separation circuit 118, and the digitized signal is stored in the frame memory 116.

By operating the operation unit 113 having the switches and the like, assigning data for assigning the display position of an image on a display unit (not shown) and the display position of information, and the like are converted into control data for controlling the address controller 114 by an I/F circuit 119, and the converted data are input to the address controller 114. The address controller 114 controls the write address of the digital television signal supplied from the up converter 106 in the frame memory 115 in accordance with the control data from the I/F circuit 119. That is, the digital television signal is stored in the frame memory 115 making the address corresponding to the display position of the image assigned by the assiging data supplied from the operation unit 113 a leading write address. Image data stored in the frame memory 116 are read in accordance with a command from the address controller 114, and are written in the frame memory 115 in a portion where the digital television signal supplied from the up converter 106 is not stored. After the above-described storage operation of the frame memory 115 by the address controller 114 has been completed, the stored signals are sequentially read from the leading address of the frame memory 115, are converted from digital signals into analog signals by the D/A converter 112, and the converted signals are output to and displayed on the display unit. Thus, it becomes possible to perform a display corresponding to another image on a blank portion in addition to the display of the television image on the display unit of the high definition image display apparatus. It is also possible to display an image signal as an image wherein a shorter side of the image substantially coincides with a shorter side of the display of the television image on the display unit.

As explained above, according to the present embodiment, an image obtained by up-converting a television signal of the NTSC system or the like into a high-definition television signal is moved within the picture surface of the display unit, and an image corresponding to a television signal generated from a TV camera in a system, such as a door interphone, a TV telephone or the like, other than the above-described television signal is displayed on a blank portion on the picture surface which is produced due to a difference in the aspect ratio between the NTSC television system and the high definition television system. Hence, it is possible to effectively utilize the blank portion on the display unit of the image display apparatus. Furthermore, by displaying an image corresponding to a television signal other than the television signal obtained by up-converting the NTSC television signal into the high-definition television signal on the blank portion, it is possible to display another image without losing part of the image obtained by the up-conversion.

What is claimed is:

1. An image display apparatus for displaying an image corresponding to an image signal, comprising:

an image display unit for displaying an image corresponding to an aspect ratio of a first image signal;

motion detection means for selectively inputting the first image signal and a second image signal having an aspect ratio different from that of the first image signal and for detecting an amount of image motion produced in an image corresponding to the second input image signal when the second image signal is input; and image signal forming means for forming an image signal having an aspect ratio equal to that of the first image signal from the second input image signal in accordance with the result of the detection by said motion detecting means, and supplying the image signal to said image display unit.

2. An image display apparatus according to claim 1, wherein said image signal forming means includes:

image signal conversion means for converting the second image signal into an image signal having a horizontal scanning period which coincides with that of the first image signal; and image signal extraction means for extracting a portion of an image signal representing an image including the largest image motion from the image signal formed by said image signal conversion means and having an aspect ratio equal to that of the first image signal in accordance with the result of the detection by said motion detecting means, and supplying the image signal to said image display unit.

3. An image display apparatus according to claim 2, wherein said image signal extraction means includes:

storage means for storing an image signal formed by said image signal conversion means; and image signal reading means for reading a portion of the image signal representing an image including the largest image motion and having an aspect ratio equal to that of the first image signal from the image signal stored by said storage means.

4. An image display apparatus for displaying an image corresponding to an image signal, comprising:

an image display unit for displaying an image corresponding to an aspect ratio of a first image signal;

motion detection means for selectively inputting the first image signal and a second image signal having a number of scanning lines different from that of the first image signal and for detecting an amount of image motion produced in an image corresponding to the second input image signal when the second image signal is input; and image signal forming means for forming an image signal having an aspect ratio equal to that of the first image signal from the second input image signal in accordance with the result of the detection by said motion detecting means, and supplying the image signal to said image display unit.

5. An image display apparatus according to claim 4, wherein said image signal forming means includes:

image signal conversion means for converting the second image signal into an image signal having a horizontal scanning period which coincides with that of the first image signal; and image signal extraction means for performing a process in which the number of scanning lines of the image signal formed by said image signal conversion means is made equal to that of the first image signal, and thereafter extracting a portion of an image signal representing an image including the largest image motion and having an aspect ratio equal to that of the first image signal from the image signal which has been processed as described above in accordance with the result of the detection by said motion detecting means, and for supplying the image signal to said image display unit.

6. An image display apparatus according to claim 5, wherein said image signal extraction means includes:

storage means for storing an image signal formed by said image signal conversion means; and image signal reading means for reading a portion of the image signal representing an image including the largest image motion and having an aspect ratio equal to that of the first image signal from the image signal which has been stored in said storage means and has been expanded perpendicularly to an image surface.

* * * * *

UNITED STATES PATENT AND TRADEMARK OFFICE
CERTIFICATE OF CORRECTION

PATENT NO. : 5,500,683
DATED : March 19, 1996
INVENTOR(S) : Yatomi et al.

It is certified that error appears in the above-indentified patent and that said Letters Patent is hereby corrected as shown below:

TITLE PAGE, ITEM

[56] REFERENCES CITED:

FOREIGN PATENT DOCUMENTS, "4008080  1/1992  Japan" should read --4-008080  1/1992  Japan--.

Signed and Sealed this

First Day of October, 1996

Attest:

BRUCE LEHMAN

Attesting Officer      Commissioner of Patents and Trademarks